(12) United States Patent
McKenzie et al.

(10) Patent No.: US 9,933,632 B2
(45) Date of Patent: Apr. 3, 2018

(54) EYEWEAR LENS PRODUCTION BY MULTI-LAYER ADDITIVE TECHNIQUES

(71) Applicant: Indizen Optical Technologies, S.L., Madrid (ES)

(72) Inventors: Andrew J. McKenzie, Long Beach, CA (US); David Mark Ambler, Rancho Palos Verdes, CA (US); Daniel Crespo Vázquez, Madrid (ES); Jose Alonso Fernández, Madrid (ES); Juan Antonio Quiroga, Madrid (ES)

(73) Assignee: Indizen Optical Technologies, S.L., Madrid (ES)

( * ) Notice: Subject to any disclaimer, the term of this patent is extended or adjusted under 35 U.S.C. 154(b) by 541 days.

(21) Appl. No.: 14/226,686

(22) Filed: Mar. 26, 2014

(65) Prior Publication Data
US 2015/0276987 A1 Oct. 1, 2015

(51) Int. Cl.
*B05D 3/06* (2006.01)
*G02C 7/04* (2006.01)
(Continued)

(52) U.S. Cl.
CPC ............ *G02C 7/04* (2013.01); *B29C 67/0066* (2013.01); *B29D 11/00442* (2013.01);
(Continued)

(58) Field of Classification Search
None
See application file for complete search history.

(56) References Cited

U.S. PATENT DOCUMENTS

| 820,849 A | 5/1906 | Copps |
| 4,575,330 A | 3/1986 | Hull |

(Continued)

FOREIGN PATENT DOCUMENTS

| EP | 2265430 B1 | 12/2010 |
| EP | 2265430 B1 | 10/2011 |

(Continued)

OTHER PUBLICATIONS

Matthew Peach, Laser additive manufacturing: separating fact from fiction, optics.org, Apr. 11, 2014, SPIE Events Europe, Ltd.; Cardiff, United Kingdom.

*Primary Examiner* — Robert S Walters, Jr.
(74) *Attorney, Agent, or Firm* — Sheppard Mullin Richter & Hampton LLP

(57) ABSTRACT

An additive processing method is used to produce a customized eyewear lens by selectively building layers of radiation-polymerized material onto a lens substrate that has optical power properties discernibly different from the optical properties of the customized eyewear lens. The method involves obtaining the lens substrate, calculating the modifications needed to convert the lens substrate's properties to the desired set of properties of the customized lens, generating an additive layer design to achieve the calculated modifications, and identifying at least one control point for confirmation or revision of the additive layer design. The method further involves applying liquid layers of radiation-polymerizable material to the lens substrate and irradiating the liquid layers in selected areas with controlled radiation such that the material is only polymerized and the additive layer is only formed in the select areas irradiated, according to the additive layer design.

19 Claims, 3 Drawing Sheets

(51) Int. Cl.
   *G02B 1/12*      (2006.01)
   *B29D 11/00*     (2006.01)
   *G02B 27/00*     (2006.01)
   *B29C 67/00*     (2017.01)
   *B33Y 80/00*     (2015.01)
   *B29L 11/00*     (2006.01)

(52) U.S. Cl.
   CPC ........ *B29D 11/00951* (2013.01); *B33Y 80/00* (2014.12); *G02B 1/12* (2013.01); *G02B 27/0012* (2013.01); *G02C 7/049* (2013.01); *B29L 2011/0041* (2013.01)

(56) References Cited

U.S. PATENT DOCUMENTS

| | | | |
|---|---|---|---|
| 4,873,029 | A | 10/1989 | Blum |
| 5,121,329 | A | 6/1992 | Crump |
| 5,178,800 | A | 1/1993 | Blum |
| 6,051,179 | A | 4/2000 | Hagenau |
| 6,749,779 | B2 | 6/2004 | Soane et al. |
| 7,002,744 | B2 | 2/2006 | Evans et al. |
| 7,235,195 | B2 | 6/2007 | Andino et al. |
| 7,658,976 | B2 | 2/2010 | Kritchman |
| 7,905,594 | B2 | 3/2011 | Widman et al. |
| 8,088,313 | B2 | 1/2012 | Hagmann et al. |
| 8,109,631 | B2 | 2/2012 | Guilloux et al. |
| 8,123,999 | B2 | 2/2012 | Priedeman, Jr. et al. |
| 8,240,849 | B2 | 8/2012 | Widman et al. |
| 8,313,828 | B2 | 11/2012 | Widman et al. |
| 8,318,055 | B2 | 11/2012 | Widman et al. |
| 8,344,046 | B2 | 1/2013 | Tucker et al. |
| 8,399,607 | B2 | 3/2013 | April, Jr. et al. |
| 8,409,670 | B2 | 4/2013 | Mori et al. |
| 2012/0019936 | A1 | 1/2012 | Blessing et al. |
| 2012/0105800 | A1 | 5/2012 | Allione et al. |
| 2015/0137426 | A1 | 5/2015 | Van Esbroeck |
| 2015/0153589 | A1 | 6/2015 | Meschenmoser et al. |
| 2015/0276987 | A1 | 10/2015 | McKenzie et al. |

FOREIGN PATENT DOCUMENTS

| | | |
|---|---|---|
| EP | 2474404 A1 | 7/2012 |
| EP | 2604414 | 6/2013 |
| EP | 2469309 B1 | 8/2013 |
| KR | 20140011874 | 1/2014 |
| WO | 2013167528 | 11/2013 |
| WO | 2014049273 | 4/2014 |
| WO | 2015014380 | 2/2015 |
| WO | 2015014381 | 2/2015 |

EYEWEAR LENS PRODUCTION BY MULTI-LAYER ADDITIVE TECHNIQUES

CROSS-REFERENCE TO RELATED APPLICATIONS

None.

FEDERALLY SPONSORED RESEARCH OR DEVELOPMENT

Not applicable.

JOINT RESEARCH AGREEMENT

Not applicable.

SEQUENCE LISTING

Not applicable.

BACKGROUND OF THE INVENTION

1. Field of the Invention

The field of the invention relates generally to methods of producing eyewear lenses, particularly spectacle lenses and lens blanks using additive techniques rather than removal of excess material.

2. Description of Related Art

Prescription eyewear lenses are commonly used to correct human vision errors, aberrations and focusing deficiencies caused by genetics, age, disease or other factors. In addition to correcting physiological vision problems, eyewear lenses may be used as a fashion accessory or to protect the eyes from hazards or discomfort.

Prescription eyewear lenses must be prepared to meet each individual's specific vision requirements. Various techniques have been developed over the years to achieve this goal. One common technique involves stocking or obtaining semi-finished lens blanks that form a series of starting blocks with discrete surface curvatures such that only one side of the blank needs to be further shaped to achieve the given prescription. The surfaced lens then needs to be polished to an optical finish and edged to the eyewear frame shape individually selected. This can be a time-consuming process. Another technique involves stocking or obtaining finished lenses that will only be edged to the individual's selected eyewear frame. However, finished lenses typically only approximate prescriptions in 0.25 D increments of sphere and cylinder corrections and therefore may be less accurate for correction. In addition, many more stocking units are needed to cover the wide range of prescriptions an eyecare professional will encounter. More recently, another technique of digitally surfacing lenses using computer controlled machining has gained prominence. Digital surfacing often requires only a limited number of semi-finished lens blanks or other starting lens constructs, but the computer-controlled surfacing equipment allows more complex (e.g., multifocal) or individualized prescriptions to be prepared. This method can involve significant expenses in equipment and trained personnel.

Each of these techniques could be described as subtractive production methods, in which excess lens material is removed to create the desired prescription or lens properties. In such processes, there is often a significant amount of waste material that must be safely handled, stored and eliminated.

It would be desirable then, if a controlled, additive process could be devised for eyewear lens preparation.

While additive-type processes for spectral filtering are well known in the thin-film deposition field, these techniques are not used to create optical power changes for the final lens. Instead, they focus on maintaining any lensing properties of an original optical part while changing specific spectral characteristics.

Some other initial developments of additive-type techniques have been described in the prior art, but still require the use of at least one additional molding surface. For example, U.S. Pat. Nos. 4,873,029, 5,178,800 and 7,002,744 B2 each describe methods of producing various optical parts by positioning pre-existing lenses or forms relative to a molding surface to create a lens-forming cavity, placing liquid lens-forming material in the cavity, and solidifying the lens-forming material onto the pre-existing lens or form such that it combines to form a new optical part when the molding surface is removed. However, these techniques still require at least one precision molding surface for manufacturing, and that molding surface must be prepared, properly stored and maintained to achieve consistent and acceptable optical-quality production.

Other additive techniques based on stereolithography, fused deposition, ink jet or 3-D printing advancements are also of interest. Many of these require a support on which to build the desired 3-dimensional part. Often these supports are flat platforms, which are not intrinsically suitable for prescription eyewear lenses. In addition, most supports are carefully removed or separated from the final printed Object, acting only as a base upon which to build the desired object. Some developments have occurred for production of flexible contact lenses using these types of techniques. For instance, U.S. Pat. Nos. 7,905,594 B2, 8,240,849 B2 and 8,318,055 B2 and EP 2265430 B1 describe use of a precision mold or forming optic as the removable platform on which to build the contact lens. Irradiating energy that causes the polymerization of the reactive solution is directed through the precision mold or forming optic to build the part against that surface. The ophthalmic part or contact lens is then removed from the mold or forming optic, to provide, by replication, an optical surface finish and desired lens curvature to the contacted side of the created part. U.S. Pat. No. 7,235,195 B2 describes contact lenses produced by stereolithography at the top of a liquid bath, specifically without the use of any mold or support. All features of the desired lens are created by spatially controlled polymerization of the surface of the liquid bath via radiation exposure, preferably from two beams at different angles.

However, some disadvantages of additive production hamper implementation of these techniques for eyewear lenses. Precision placement and control of layers is costly and time-consuming. Eyewear lenses require much more material than contact lenses or intraocular implants and therefore exacerbate these disadvantages. Materials suitable for additive production of plastic parts or even materials suitable for small, thin, flexible contact lenses may not combine the necessary optical and structural properties required for eyewear lenses that will be mounted in eyeglass frames. Yet efforts toward improvements and new inventions in the field of additive production techniques are warranted given the potential advantages of these methods.

BRIEF SUMMARY OF THE INVENTION

The inventors determined effective and innovative approaches to create eyewear lenses using additive production techniques. An existing optical lens substrate is used as a starting structure on which specific ophthalmic features are built using additive production techniques. In contrast to other approaches to additive manufacturing, the lens substrate becomes an integral part of the final eyewear lens, and the invention's additive production processes are used to change its optical and physical characteristics to create an eyewear lens customized to the specific wearer's needs.

Preferably, the lens substrate is selected from finished lens blanks, semi-finished lens blanks, plano lens blanks, plano edged lenses and finished edged lenses. The lens substrate comprises at least a first and second surface, one of which will be positioned nearest the eye and one that will be positioned away from the eye when worn. In a preferred embodiment, the lens substrate's surfaces may comprise treatments or coatings to enhance adhesion of subsequent layers. In a preferred embodiment, the lens substrate will have optical power properties that are discernibly different, when viewed with the unaided eye, from the optical power properties of the customized eyewear lens.

The process includes calculating the modifications needed to convert the lens substrate's optical power properties to the properties desired for the customized eyewear lens and then generating an additive layer design to achieve these modifications. In another embodiment of the invention, in addition to modifying optical power properties, the additive layer design is calculated and generated to modify other properties of the lens substrate for the customized eyewear lens, such as polarization, photochromicity, UV transmittance, visible transmittance, light reflectance, hydrophobicity, chemical resistance, abrasion resistance, impact resistance, and electrical conductivity.

To create the layers of the additive layer design, first radiation-polymerizable material is applied as a liquid layer onto at least a portion of one of the surfaces of the substrate and then a selected area of the liquid layer is irradiated with radiation that is controlled for wavelength range, energy and spatial distribution to form an additive layer by polymerization only in the selected area of irradiation. The liquid layer is irradiated and polymerized selectively to form the additive layer in accordance with the additive layer design. In addition, the additive layer is integrally bonded to the lens substrate.

In a preferred embodiment, radiation-polymerizable liquid material is applied to only one surface of the substrate. In another preferred embodiment, radiation-polymerizable liquid material is applied to both the first and second surfaces of the substrate, either simultaneously or sequentially. In preferred embodiments, the radiation-polymerizable material is applied by methods such as spin, dip, spray, roller, blade or curtain coating.

In a preferred embodiment, the angle and position of the lens substrate relative to the radiation-polymerizable material can be controlled while the liquid layer is applied. In a preferred embodiment, the lens substrate is moving with respect to the radiation-polymerizable material as the material is applied. In a further preferred embodiment, the lens substrate moves in at least one direction chosen from Y-translation, Z-translation and angle $\alpha$ rotation while the radiation-polymerizable material is applied. In another preferred embodiment, the lens substrate is moving at a non-perpendicular angle with respect to the radiation-polymerizable material being applied. In another preferred embodiment the angle, speed and/or direction of movement of the lens substrate varies while the radiation-polymerizable material is applied.

In a further preferred embodiment, the lens substrate is moving at a non-perpendicular angle with respect to the radiation-polymerizable material during irradiation of the liquid layer. In a preferred embodiment, the lens substrate moves in at least one direction chosen from Y-translation, Z-translation and angle $\alpha$ rotation while the radiation-polymerizable material is being irradiated. In another preferred embodiment the angle, speed and/or direction of movement of the lens substrate varies while the radiation-polymerizable material of the applied liquid layer is being irradiated.

In a preferred embodiment, the radiation used to irradiate the liquid layer is chosen from thermal, microwave, radio-frequency, ultraviolet, visible and infrared energy.

Additional liquid layers of radiation-polymerizable material may be applied to continue to build the customized eyewear lens' features. In a preferred embodiment, the second liquid layer is applied to an application zone selected from at least a portion of the first additive layer, at least a portion of one of the lens substrate's surfaces, or a combination of both a portion of a lens substrate surface and a portion of the first additive layer. In a preferred embodiment, this process is repeated for multiple additional liquid layers that may be applied to application zones selected from at least a portion of one of the lens substrate's surfaces and/or portions of previously applied additive layers.

In a preferred embodiment, the lens substrate is moving while the additional liquid layer(s) are being applied, and this movement may not be the same as the substrate's movement while the first liquid layer was applied. In a preferred embodiment, the angle, speed and/or direction of movement of the lens substrate varies while the radiation-polymerizable material of the additional liquid layer(s) is applied.

To form the additional additive layers, selected areas of each of the additional liquid layers are irradiated with radiation that is controlled for wavelength range, energy and spatial distribution. This selective irradiation forms each additive layer by polymerization only in the selected area of each liquid layer that is irradiated. The additional liquid layers are irradiated according to the additive layer design, and the additional additive layers are integrally bonded to their application zones.

In a further preferred embodiment, the lens substrate is moving while the additional liquid layer(s) are being irradiated, and this movement may not be the same as the substrate's movement while the first liquid layer was irradiated. In another preferred embodiment, the angle, speed and/or direction of movement of the lens substrate varies while the radiation-polymerizable material of the additional liquid layer(s) is irradiated.

In a preferred embodiment, the additive layer design includes two or more additive layers. In another preferred embodiment, the additive layer design includes at least 50 additive layers. In another preferred embodiment, the additive layer design includes at least 200 additive layers.

In another preferred embodiment, the method further comprises at least one control point with error limits for the additive layer design. At a control point, one measures localized optical and/or physical properties of the lens substrate and/or the additive layer or layers at one or more measurement locations, calculates the error between the measured properties and the expected results for the additive layer design of the desired customized eyewear lens, compares the error with the error limits for the control point, and if the error is greater than the error limits, revises the additive layer design based on the difference between the measured result and the design. In a preferred embodiment, localized properties are measured at the control point's measurement location(s), and are selected from the slope, optical power, position and/or thickness (height) of the additive layer(s) present at the measurement location, and the optical through-power of the combination of the lens substrate and the additive layers present at the measurement location.

Some preferred techniques for measurement of localized properties include reflected light deflectometry, transmitted light deflectometry, Moiré pattern comparison and triangulation.

In a preferred embodiment, the additive layer or layers formed from the radiation-polymerizable material(s) have measurably different optical or physical properties from the lens substrate. In one preferred embodiment, the additive layer's measurably different properties are selected from refractive index, Abbe value, abrasion resistance, impact resistance, resistance to organic solvents, resistance to bases, Tg, visible transmittance, UV transmittance, polarization or photochromic properties.

In preferred embodiments of the invention, the radiation-polymerizable material further comprises components to tailor the optical, mechanical, chemical or physical properties of the eyewear lens. In a preferred embodiment, the components are selected from photo-initiators, UV absorbers, UV reflectors, infrared reflectors, infrared absorbers, visible tints, dyes, pigments, photochromic agents, electrochromic agents, thermochromic agents, thermal stabilizers, electrically conductive materials, liquid crystal materials, and polarizers, including active polarizing materials. In another preferred embodiment, the components may include decorations, particles with properties that enhance or modify the radiation-polymerizable material's physical or optical properties, such as light absorbing or light reflecting particles, embedded sensors, transmitters or displays.

In preferred embodiments, the radiation-polymerizable material of additional additive layer(s) may be either the same or different from the radiation-polymerizable material used for the first additive layer. In preferred embodiments, the radiation-polymerizable material of additional additive layer(s) comprises different components than the radiation-polymerizable material used for the first additive layer. In another preferred embodiment, the additional additive layer(s) has measurably different optical or physical properties from the first radiation-polymerizable material.

In another preferred embodiment, irradiation of the selected area of at least one liquid layer forms the resultant additive layer in a position such that it smoothes over features such as discontinuities, defects or irregularities on a surface of the lens substrate, or edges of one or more previously-applied additive layers. In another preferred embodiment, a layer comprising a photo-initiator is applied as part of the method for producing the customized eyewear lens.

DETAILED DESCRIPTION OF THE INVENTION

The present invention is embodied in additive methods to produce an eyewear lens by selectively adding radiation-polymerizable layers to an existing lens substrate. In this way, the invention enables individually customized eyewear lenses to be created with the optical and physical properties desired by building upon standard lens substrates. No additional and expensive precision molds or replication forming optics are required for the invention.

Eyewear lenses are ophthalmic lenses worn in front of the eyes. They may be plano, prescription or non-prescription lenses. Depending on the needs and desires of the individual, they may serve one or more purposes, including correcting vision, providing protection or improved comfort for the eyes, or being a fashionable accessory. Eyewear lenses are commonly mounted in structures designed to hold the lenses in front of the user's eyes. Such structures include spectacle (eyeglass) frames, goggles, helmets, shields, visors, lens carriers and other mounting devices.

The present invention addresses the need to customize a lens for a specific person. This can provide the individual's vision corrective prescription and/or include other eyewear lens attributes that the person has requested. Some examples of other attributes the person may want include fashion or functional tints, photochromic response to sunlight, or increased abrasion or impact resistance. In addition, the optical design of the customized lens may be selected or optimized for the individual's specific frame configuration, specific tasks the user will perform, or the way the individual moves their eyes or head to accomplish desired tasks. For example, if a very narrow frame has been chosen, but the individual has both distance and near vision correction requirements, the customized eyewear lens must accommodate both vision needs within a very limited space. As another example, if the customized eyewear lens is intended for use primarily while viewing a handheld device, the lens' transmittance and its proportion of near versus distance prescription areas may be quite different from a lens customized for distance sighting while sailing. The present invention provides efficient and practical methods of customizing these and other lenses by combining known ophthalmic lens manufacturing with custom 3-D additive production techniques.

The additive process of the invention comprises at least a change in the optical power properties from the lens substrate to those desired for the customized eyewear lens. The additive process may also comprise other optical, chemical or physical changes between the lens substrate and the customized eyewear lens.

Figure 1A:
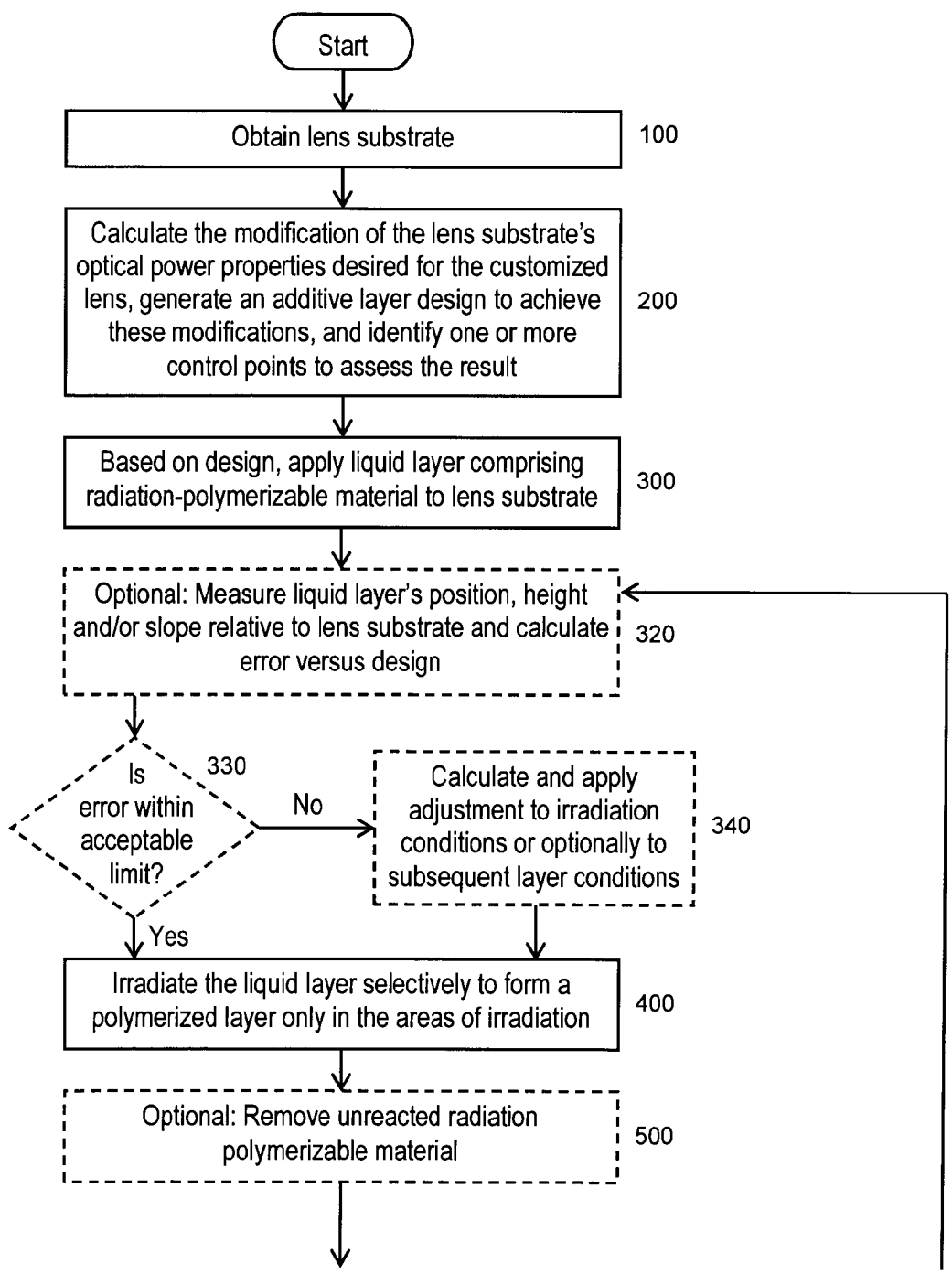
FIG. 1A and FIG. 1B show an exemplary flowchart of the steps of one embodiment of the invention, in addition to optional steps for alternative embodiments.
Figure 1B:
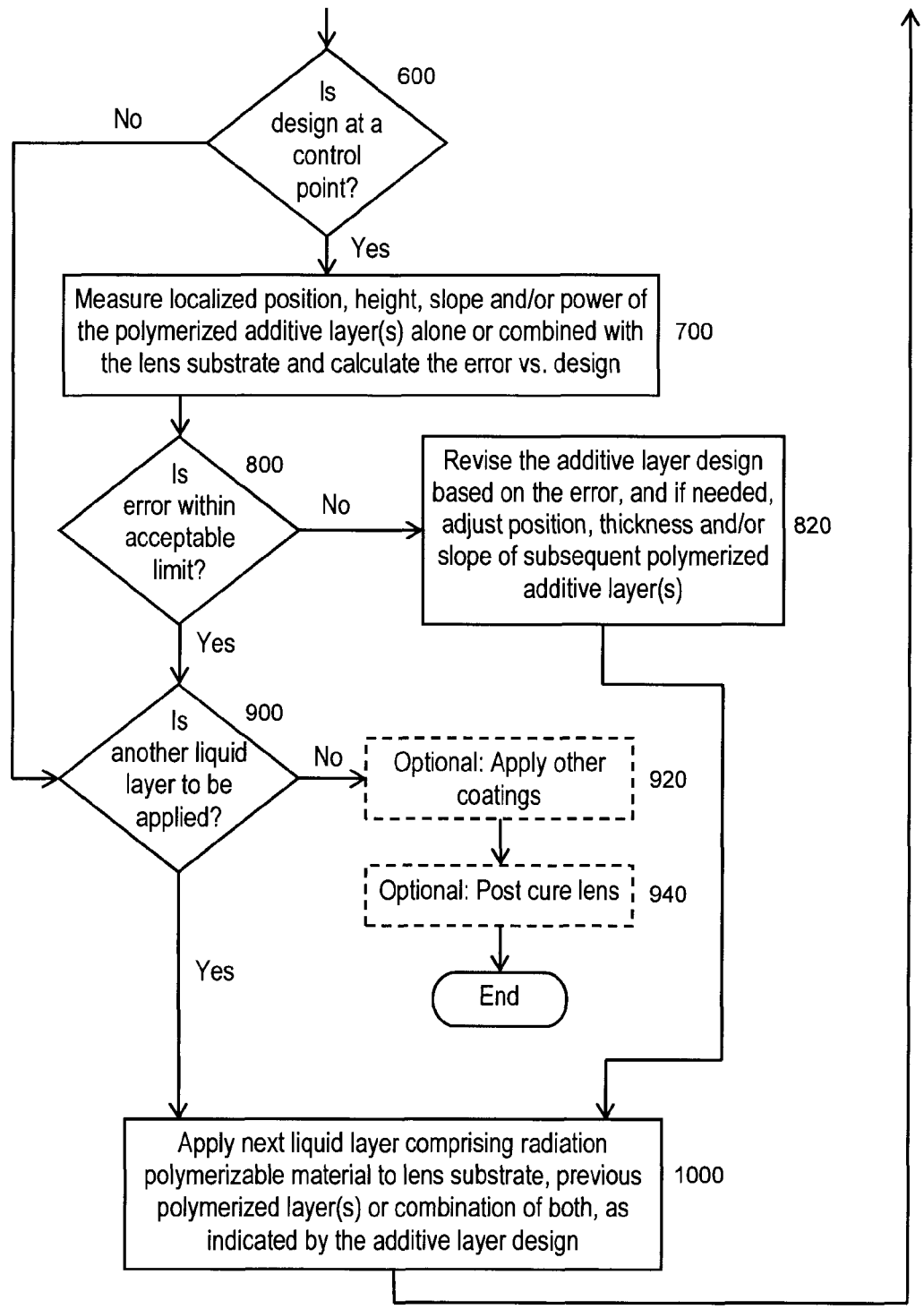

As an aid to understanding, FIG. 1A and FIG. 1B provides an exemplary flowchart of steps of the invention, including several optional steps. The optional steps and any associated follow-on actions are indicated in the flow chart by dotted lines. The details of the flowchart's steps are further explained below.

At step 100, a lens substrate is obtained for use in the invention. Many lens substrates are available on the open market from eyewear lens manufacturers. It will be understood by those of skill in the art that the lens substrates can also be obtained by producing the substrates by various methods one's self or by contract manufacturing. Lens substrates can be manufactured by many different methods, including thermoset processes, thermoplastic injection or injection-compression molding, reactive injection molding, controlled material removal techniques to shape or polish an initial part, additive techniques to build a substrate, and other methods.

Lens substrates are designed to have at least some of the essential properties required for eyewear lenses, but may not be fully configured with all the attributes needed by the individual, or may not be of the final lens outline desired for mounting. Lens substrates may be flat, spherically curved or have simple or complex aspheric curvature. Their surfaces may contain discontinuities, such as stepped multifocal sections, or changing curvatures, such as progressive or lenticular features.

Examples of typical lens substrates include lens blanks that are made of materials and designs suitable for ophthalmic lenses, but are not in final form for a wearer's use. Lens blanks need to be further shaped or modified to produce a prescription or non-prescription optical power, or to fit within an eyewear frame. Many eyewear lens blanks have one surface that is curved or formed suitably for mounting in eyewear frames and supplying some ophthalmic attributes, but the other, opposite surface needs to be ground and polished to complete the full prescription power required by the individual wearer. Such eyewear lens blanks are known in the art as "semi-finished" lens blanks. "Finished" lens blanks have both surfaces prepared to provide specific spherical and cylindrical vision corrective optical power, but these blanks have diameters larger than most eyewear frames, such that they may be custom-edged down to the final shape and size needed to fit in an individual's chosen frame. Other lens substrates suitable for the invention include plano lens blanks, which have no vision corrective power but may include other eyewear attributes such as tint, polarization, photochromic response, impact resistance, or other features the individual desires. Other lens substrates suitable for the invention include edged lenses or lens blanks that have been shaped to fit the final selected eyewear frame. Such edged lenses may have corrective vision optical power, or no power (piano).

Preferably, the lens substrate obtained will have at least some attributes desired by the individual for their customized eyewear lens. These may be as basic as being of a plastic or glass material that will not deform unacceptably in the frame, or will not degrade too quickly in use. The lens substrate may also provide part of the vision correction desired (for example, distance correction, but not near add power). As other examples, semi-finished lens blanks may provide starting curvature(s) for preparing vision correction, or a lens curvature suitable for the frame configuration. The lens substrate may also include additional desired features such as, for example, polarization, tint, gradient tint, photochromic properties, blocking of ultraviolet (UV) or infrared light, light-absorbing particles, or electrochromic properties. The lens substrate may also comprise active display elements, sensors, transmitters, decorations, micro-optics or other features. The lens substrate may provide some physical properties desired, such as fundamental impact resistance, abrasion resistance, thermal stability, desired refractive index, or other attributes. The lens substrate may also comprise other elements such as films, wafers, inserts or other objects.

However, in all instances, the lens substrate does not embody all the attributes desired for the customized eyewear lens. The additive production techniques of the invention are used to provide additional customized attributes to the lens. This approach is desirable and useful because it means that a much more limited inventory of substrates can be stocked. In addition, this smaller inventory may comprise simpler, less expensive lens substrates, and the invention will be used to provide the more complicated, unique or costly attributes desired on an individual basis.

Preferred lens substrates for the invention include finished lens blanks, semi-finished lens blanks, plano lens blanks, plano edged lenses and finished edged lenses.

The lens substrate comprises at least a first and a second surface, one of which will be positioned nearest the eye and one that will be positioned away from the eye when worn in the eyewear frame.

The lens substrate may comprise coatings or treatments on its surfaces. For example, one or both of its surfaces may be supplied with hard coats for improved abrasion resistance and/or chemical resistance. Other possible coatings include, for examples, conductive, polarized, photochromic, electrochromic, electro-active, hydrophobic, anti-reflective, UV or visible filters, or tints. Treatments may have been performed on the substrates to provide, enhance or change surface properties such as, for example, cleanability, adhesion to subsequent layers, crack resistance, chemical resistance, thermal stability, or other attributes. Such treatments can be applied by many known techniques, including plasma, corona, solution, solvent, vapor, and surface activation, among others. In a preferred embodiment, the lens substrate's surfaces may comprise treatments or coatings to enhance adhesion of subsequent layers, including adhesion to the additive production layers.

Step 200 summarizes the initial calculation and design activities to convert the lens substrate's properties to those desired for the customized eyewear lens. First, the modifications of the lens substrate needed to achieve the desired properties for the customized eyewear lens are calculated. Then, these modifications are converted into a design of layers to be added to the lens substrate. In this description, the calculated design will be referred to as the additive layer design. In addition, one or more control points are identified for the additive layer design, to allow confirmation or revision as needed to achieve the customized eyewear lens.

Specifically, for the invention, it is expected that the lens substrate will not have the optical power properties desired for the customized eyewear lens. In one embodiment, the lens substrate will have discernibly different optical power properties than the customized eyewear lens. As one non-limiting example, the lens substrate may be a single vision spherical finished lens with an optical power of $-2$ Diopters, while the customized lens requires a spherical distance optical power of $-2$ Diopters and an add power reading area 10 mm below the optical center with an optical power of $+1.5$ Diopters. In a preferred embodiment of the invention, the optical power differences between the lens substrate and the customized eyewear lens will be discernible to the unaided eye. For instance, in the non-limiting example given above, one would see a marked difference when viewing a printed page through each of these samples.

In a preferred embodiment of the invention, the additive layer design is generated to convert the lens substrate's optical power properties to discernibly different optical power properties as desired for the customized eyewear lens. In a further preferred embodiment, this discernible change in optical power may convert the lens substrate's optical power to the total optical power required for the final prescription of the customized eyewear lens. In another preferred embodiment, the additive layer design may convert the lens substrate's optical power properties to discernibly different optical power properties for the customized lens that are not the final prescription required, but are intermediate toward those values and therefore simplify further lens processing of the customized eyewear lens. This change to intermediate optical power properties may be particularly preferred when the lens substrate is a semi-finished lens blank. A conversion of optical power properties by the additive layer design to intermediate values may also be desired for the customized eyewear lens if it is anticipated that other specialized coatings or treatment of the customized lens will be performed. Thus, it is anticipated that the additive layer design of the invention will provide a discernible change in the optical power of the lens substrate, but may provide either all or a part the total prescription power for the final customized eyewear lens.

In a further preferred embodiment, the additive layer design will not only convert the lens substrate's optical power to a different optical power desired for the customized eyewear lens, but will also provide other customized properties for the customized lens. To provide additional customization, the additive layer design may be calculated and generated to include modification of optical, chemical and physical properties between the lens substrate and the customized eyewear lens. As non-limiting examples, the additive layer design may modify properties for the final customized eyewear lens such as polarization, photochromicity, UV transmittance, visible transmittance, light reflectance, hydrophobicity, chemical resistance, abrasion resistance, impact resistance, or electrical conductivity.

The attributes of the customized eyewear lens that are to be supplied by the additive layer design, plus the characteristics of the lens substrate of step 100, are input for the design calculations at step 200. The lens substrate's surfaces will be measured (e.g., by optical or physical metrology) or known, and can be expressed by one or more equations, or described by a unique set of xyz coordinates. These equation(s) or coordinate values, along with the desired change in optical power, and any other features that the additive layer design is intended to address, are then entered into calculation routines to optimize and define the total changes needed to convert from the lens substrate surface(s) to the customized eyewear lens. These calculations can be accomplished by many known techniques, including ray tracing, wavefront propagation analysis, curvature calculation, combinations of these techniques, and other techniques known to those of skill in the art.

As one example, the lens substrate surface (or surfaces) can be modeled mathematically as a sum of multiple, orthogonal Zernike polynomials, ordered according to the Wyant-Creath scheme; the coefficients of this surface representation become the input for the prescribed lens calculations. Calculations are then performed via exact ray tracing to incorporate this lens substrate information with the customized eyewear lens parameters, and determine the added layer design's needed characteristics to satisfy the desired optical power requirements for the customized lens. As another example, the new surface that will be created for the customized eyewear lens (by the material added to the lens substrate by the additive layer design) may also be represented by a separate expansion of multiple Zernike polynomials. To achieve the customized lens' desired optical power requirements, the design coefficients of this second Zernike polynomial expansion are found by minimization of a merit function that compares the actual power map at any stage of the computation with a theoretical power map. The optimization can be carried out using the BFGS (Broyden-Fletcher-Goldfarb-Shanno) optimization algorithm. Other calculation and optimization approaches will be recognized by those of skill in the art.

Once the total amount of change that must be made to the lens substrate to arrive at the desired attributes of the customized lens is calculated, it is converted to a series of layers to be applied by additive processing to the lens substrate surface(s) to achieve the change. The additive layer design will be calculated and generated to add material selectively only in those areas where it is needed. This additive process represents a very different technique to create a customized eyewear lens. Previous approaches would approximate optical power needed for a prescription design by simple spherical and toroidal surfacing techniques, but were typically limited by hard tooling to discrete and rather large increments between power changes. Techniques that are more sophisticated might employ various calculation and optimization steps, but then feed that information into computer-controlled surfacing equipment that again removes excess material from the lens substrate or lens blank, causing waste in the removal process. In contrast, the inventors' technique approaches this problem differently, and innovatively adds material selectively to achieve a customized lens rather than removing material from an existing lens blank or block of material.

To generate the additive layer design, each additive layer's thickness, as well as its position on the lens substrate surface (or on previous additive layers) and its slope with respect to the lens substrate or previous additive layer(s) is calculated and optimized for realistic production applications. For example, it may not be reasonable in production to have a layer thickness of 0.1 millimeters that must be controlled to 0.1 nanometer accuracy; instead, one may design multiple thinner layers to achieve the same result. Alternatively, one may re-calculate the additive layer design such that 0.1 millimeter thick applied layers are controlled to 1 micrometer (0.001 millimeter) precision.

The calculation and generation of the additive layer design can include factors such as: the total number of layers; whether layers will be added to one or both surfaces of the substrate; whether the same or different materials will be used for each layer; and the position, thickness (height), and slope of each layer, plus acceptable max/min limits for each of these three layer parameters. These factors may be determined and optimized at multiple locations across the lens substrate's surface(s) to provide a more precisely customized lens. In a further preferred embodiment, the decisions on additive layer designs may consider practical factors such as keeping the number of layers or the number of radiation-polymerizable materials to be used manageable and efficient within the intended production environment, and planning for the likely error or control limits on the layers such that stacked errors do not compromise the final design performance. Those of skill in the art will recognize other design factors that can be incorporated.

At this point in the additive layer design calculations, both the final desired surface for the customized eyewear lens, $z_F(x,y)$, and the initial surface of the substrate, $z_S(x,y)$, are known. Therefore, at each design location (x,y), we need to build material between $z_S(x,y)$ and $z_F(x,y)$ to achieve the customized lens. The total height of material to be built at each design location is $\Delta z(x,y)=z_F(x,y)-z_S(x,y)$.

As one example of the inventive process, one may consider the option that this total height of material is built using layers with the same maximum local thickness of $h_L$. It is then necessary to compute the local thickness of material to be added in each layer at the various (x,y) locations on the lens substrate surface(s) so that the addition of the different layers yields the desired final surface of the customized eyewear lens. That local thickness of each layer can be computed as $t_L(x,y)=\max(0, \min(z_F(x,y)-z_{L-1}(x,y), h_L))$, where $z_L(x,y)=t_L(x,y)+z_{L-1}(x,y)$ is the surface sagittal height of the Lth layer of radiation-polymerized material being added. The values for the lens substrate, $z_0(x,y)$, can be derived or obtained from direct measurement of the actual surface formed by the lens substrate and used for the initial calculations of $t_L(x,y)$ in the additive layer design. The values for the $z_{L-1}(x,y)$ layers used in the computation of $t_L(x,y)$ can be estimated based on the number of layers added as the additive layer design is calculated.

In a preferred embodiment of the invention, the additive layer design comprises one additive layer. In another preferred embodiment, the additive layer design comprises two additive layers. In other preferred embodiments, the additive layer design comprises two or more additive layers, three or more additive layers, ten or more additive layers, fifty or more additive layers, or two hundred or more additive layers. For some customized eyewear lenses, five hundred or more additive layers may be used to create the desired lens properties.

The design activities of step 200 also incorporate one or more control points associated with the additive layer design. At a control point, the inventors interrogate the localized properties of one or more of the additive layer(s) applied in order to determine if the additive layers are within the expected tolerances, or whether adjustments or revisions need to be made to the additive layer design. These control points may comprise, for example, part of the computer instructions that govern the additive processing steps, or may be separate actions taken to assist the additive process. Measurements at the control point(s) may be conducted at one or more locations on the lens substrate, at one or more locations on the last applied additive layer, or at one or more locations on different additive layers. As one option for a control point, the same or different localized properties may be measured at different measurement locations.

Results measured at the control point(s) will be compared with the additive layer design's expected results at that point and error limits defined for the control point(s). As described below, the comparison is used to determine if revisions of the additive layer design, or to its application methods, are needed to achieve the desired customized lens. If the comparison indicates corrections are needed, the measured results and error comparison are used to generate a revised additive layer design for continued processing to achieve the results of conversion from the lens substrate to the customized eyewear lens.

Once the additive layer design and its control point(s) are generated, one can begin the additive processing at step 300. Optionally, before the first additive layer is applied, one may measure or sense the lens substrate, to confirm its surface properties, orientation, mounting or other characteristics, and ensure that the lens substrate is in the correct starting position for the additive processing.

Based on the additive layer design, a liquid layer comprising radiation-polymerizable material is applied to at least a portion of one surface of the lens substrate. As will be described in more detail below, the liquid layer is the precursor to the additive layer. Liquid layers with a wide range of viscosities may be used, depending on the radiation-polymerizable material and other components chosen. By selective irradiation of the liquid layer according to the additive layer design, an additive layer comprised of radiation-polymerized material is formed on the lens substrate and/or on previous additive layers. The combination of additive layers deposited according to the additive layer design with the lens substrate creates the customized eyewear lens.

The liquid layer comprises radiation-polymerizable material, meaning that the material will form a solid polymeric system when it is subjected to radiation with a specific range of properties including wavelength and energy density. For instance, the material may be engineered and formulated to be responsive to polymerization by ultraviolet radiation, but not infrared radiation. In another example, the radiation-polymerizable material may be selectively responsive to polymerization when irradiated at shorter UV radiation but not longer UV wavelengths (e.g., 320 nm but not 365 nm). This allows more control of the reaction process and less difficulty in handling. By controlling the wavelength range, energy density and spatial distribution of the radiation, one can achieve the desired effect of polymerizing the material only in the area irradiated; by design, outside the area irradiated, there is insufficient energy to cause the material to react. The energy density can also control the depth (thickness) of reaction and the time required for polymerization of the material.

Several different radiation-polymerizable materials are known in the art of additive processing. Many are based on organic chemistry, but may include inorganic and metallo-organic species, too. One distinct advantage of the invention's process is that the lens substrate may have certain necessary physical and optical properties for an ophthalmic eyewear lens that cannot be achieved simply with additive processing materials. For instance, the lens substrate may provide all or most of the structural stability needed to maintain lens integrity in the eyewear frame, while the additive layers add other features, but are thin enough that this structural integrity is not degraded. As another example, the additive layers may have slight residual color or may lack UV blocking that would render them unacceptable as a bulk lens material, but does not compromise performance in a thin layer added to the lens substrate. Thus, the additive layers may not have the same constraints on optical or physical properties as the lens substrate, but may be combined with the substrate to form a viable eyewear lens.

In one embodiment of the invention, the radiation-polymerizable material may create layers having the same properties as the lens substrate. In this instance, the additive layers can be used to refine the optical or physical performance of the lens substrate. For example, the additive layers may be added to create certain select areas of greater thickness or higher curvature, corresponding to additional optical power in those regions of the final eyewear lens. In another example, the additive layer(s) can be positioned and designed to smooth over features, including discontinuities, defects or irregularities on the lens substrate.

In another preferred embodiment, the radiation-polymerizable material has measurably different optical or physical properties from the lens substrate, or upon polymerization, forms an additive layer with measurably different properties from the lens substrate. For example, consider the application mentioned previously of the individual having both distance and near vision correction requirements but selecting a very narrow frame. The invention could use a lens substrate that satisfies the distance prescription, and additive layers of significantly higher refractive index, such that the additive layers provide the near add power with a thinner construction than a lens made with only one refractive index. In addition, the additive layers can be positioned specifically to provide add power in the areas of the lens that will be needed in the small frame. As another example, for the lens mentioned previously that is customized for distance sighting while sailing, the additive layer could provide polarization to block glare from the water, thus, ensuring better comfort and clarity of vision.

In one preferred embodiment, the measurably different properties for the additive layer formed from the radiation-polymerizable material are selected from refractive index, Abbe value, abrasion resistance, impact resistance, resistance to organic solvents, resistance to bases, Tg, visible transmittance, UV transmittance, polarization or photochromic properties.

In addition to the radiation-polymerizable material itself having different properties than the lens substrate, the radiation-polymerizable material may comprise components to tailor the optical or physical properties of the eyewear lens. For example, components may comprise photo-initiators, UV absorbers, UV reflectors, infrared reflectors, infrared absorbers, visible tints, dyes, pigments, photochromic agents, thermochromic agents, electrochromic agents, polarizers, thermal stabilizers, electrically conductive materials, liquid crystal materials, active polarization materials, light absorbing particles, light reflecting particles, and particles or materials that increase the impact resistance or abrasion resistance of the radiation-polymerizable material. In addition, components such as decorations, sensors, transmitters, displays and other small devices may be added to the radiation-polymerizable material. One or more of these components may be combined in or with the radiation-polymerizable material.

The liquid layer is applied to an area of the lens substrate and/or area(s) of previous additive layers at least as extensive as the area its resultant additive layer is designed to cover. The liquid layer may be applied to one or both of the lens substrate's surfaces. The liquid layer may be applied in a continuous layer over an entire surface, or only on a portion of a surface. For example, as mentioned in the illustration of the individual having both distance and near vision correction requirements but selecting a very narrow frame, the liquid layer could be applied only in the area of the lens surface used for near vision viewing, and the resultant additive layer would provide extra add power only in that region. The layer may also be patterned or discontinuous. These could be useful for example, if an active display or a decorative design is being created on the customized eyewear lens.

The liquid layer may be applied by different methods known in the coating industry, selected for ease of application, production utility, versatility, cost, availability and other manufacturing considerations. For example, when the radiation-polymerizable material is applied to only one surface of the lens substrate, single surface coating methods such as spin, spray, roller, blade and curtain coating may be used. If desired, the other surface of the lens substrate may be covered or protected with a protective material to keep radiation-polymerizable material from inadvertently contacting it. For example, a thin sheet of protective plastic may be applied, held by static, or mechanically held against the other surface to protect it. As another example of protective materials, one surface of the lens substrate may comprise a protective coating or layer that may be removed after one or more layers of the additive layer design are applied.

In many instances, the lens substrate may have a configuration such that one surface is concave and the other surface is convex. In theory, the liquid layer may be applied to either surface. The practical decision on which surface to use can be based on many factors and provided either as an input value or further optimized during the design program. Examples of some of the factors to consider include coating equipment capabilities and limitations, viscosity and uniformity of the liquid radiation-polymerizable material, desired layer thickness, total layer thicknesses, and cosmetic, optical and structural requirements of the final customized eyewear lens.

In another preferred embodiment, radiation-polymerizable liquid material is applied to both the first and second surfaces of the lens substrate. The layer can be applied simultaneously to both surfaces, or sequentially to each surface.

One preferred embodiment for simultaneously applying the liquid layer to both surfaces is dip coating. Dip coating equipment may also be used to apply radiation-polymerizable material to only one surface of the lens substrate. In this case, the other surface is covered or protected such that additive processing is directed only to the unprotected surface of the substrate. For example, the other surface, or portions of it, may be covered or protected by an applied plastic sheet, a removable coating or film, or other protective materials known in the coating art.

In a preferred embodiment, the angle and position of the lens substrate relative to the radiation-polymerizable material is controlled while the liquid layer is applied. Such orientational control will assist in controlling the position and thickness of the resultant additive layer, particularly on a curved lens substrate surface.

The lens substrate may be stationary during application of the liquid radiation-polymerizable material. However, particularly if dip coating methods are used, it is preferred that the lens substrate moves with respect to the radiation-polymerizable material as the material is applied. Such movement can be limited to one axis, or can allow variation in multiple axes. In addition, the movement may include both translation and rotation of the lens substrate relative to one or more axes.

Figure 2:
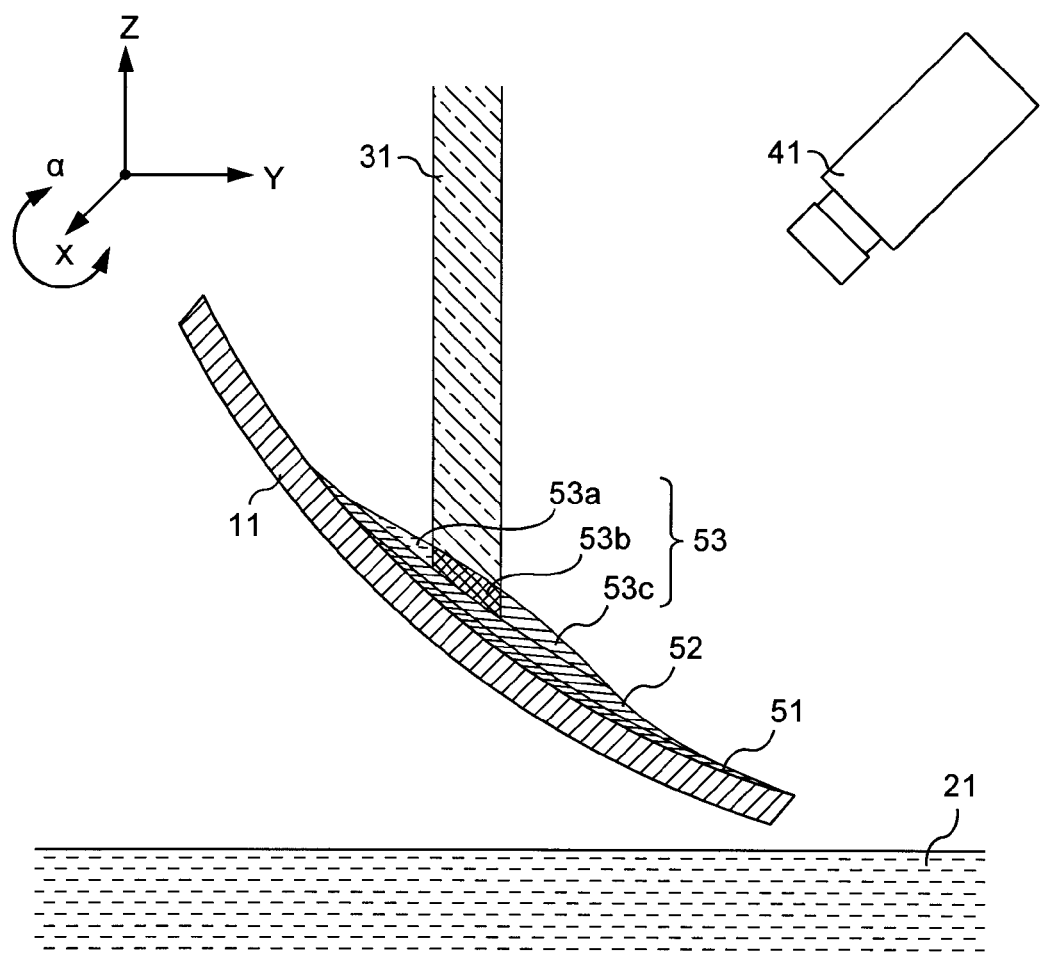
FIG. 2 illustrates one example of a method of the invention for applying the radiation-polymerizable material, and for measuring the optical properties of the applied layer(s) and/or the lens substrate.

One example of a preferred method of lens substrate movement is illustrated in FIG. 2. In this exemplary illustration, a configuration of lens movement in combination with a dip coating system is shown. A typical method of dipping a part is to have it enter perpendicular to the liquid level. In contrast, it is preferred to have the lens substrate 11 enter the bath of liquid radiation-polymerizable material 21 and move at a shallower angle for more control and more area of contact between the lens surface and the liquid meniscus. As indicated, substrate 11 in this preferred embodiment can be moved with the following directional controls: rotation of the lens around the X-axis (an angular motion, designated for convenience as angle α, around the x-axis that is perpendicular to the plane of the figure, i.e., coming out toward the viewer), movement in the Y-direction (the horizontal direction in FIG. 2), movement in the Z-direction (the vertical direction in FIG. 2), and simultaneous change of any combination of these factors. In addition, in a preferred embodiment, the rate of movement in any axis or combination of axes (including angle of contact with the liquid) can be changed or reversed during the time the layer is applied. These controls of angle, speed and/or direction of movement of the lens substrate, plus the ability to vary these parameters while the radiation-polymerizable material is applied, provide added advantages to change the thickness of the applied additive layer, correct for errors or accommodate previous features on the surface. An additional benefit of this method is that such controlled movement of the lens substrate can be used to smooth defects or edges of previous additive layers or of the liquid layer being applied and irradiated.

The support mechanism for the lens substrate is not illustrated in FIG. 2, but several techniques are known to those of ordinary skill in the art. For example, the lens substrate may be held or supported at its edges by a continuous holder, by a discrete edge grip, or by one or more point supports. Alternatively, if radiation-polymerizable material is being applied only to one surface (or only to one surface at a time) the lens substrate may be supported on its other surface by vacuum, adhesive or other physical mounting techniques. As mentioned previously, the other surface may also be covered with protective material to maintain its original surface characteristics.

While the translational and rotational movement of the lens substrate is illustrated in FIG. 2 with respect to a dip coating system, rotational and/or translational movement control is applicable to other methods of the invention, too. For example, the same type of lens substrate movements may be suitable for spray or curtain coating systems. In addition, other combinations of rotational/translational movement(s) may be suitable for various methods of applying the liquid radiation-polymerizable material that will become the additive layers.

Alternatively, or in addition to the lens substrate movement, the radiation-polymerizable material may be in motion while it is applied. For example, when a liquid bath is used, the liquid may be agitated mechanically or subjected to ultrasonic energy or gas flows to cause movement in the bulk of the liquid material, or on the liquid surface. Such movement may be preferred to lessen sharp or stepped edges when the liquid is applied and polymerized.

In a preferred embodiment, the environment around the lens substrate and the liquid radiation-polymerizable material is controlled during liquid layer application. In one preferred embodiment, an oxygen-depleted or inert atmosphere (e.g., argon or nitrogen) is used in the vicinity of the coating equipment. As an example, the atmosphere may be controlled over the tank (such as a dipping tank) or the exposed volume of liquid used during coating application. In another preferred embodiment, the relative humidity of the atmosphere is controlled to lessen unwanted water condensation, side reactions or haze of the radiation-polymerizable material. In another preferred embodiment, the temperature in the vicinity of the coating equipment and/or the temperature of the liquid radiation-polymerizable material are regulated to prevent or lessen changes in viscosity or control reaction rates. In another preferred embodiment, the atmosphere is controlled or filtered to reduce particulates or contaminants.

In another preferred embodiment, the radiation-polymerizable material may be held in a holding tank or reservoir prior to and during the liquid layer application. The liquid radiation-polymerizable material may be filtered to reduce unwanted particulate formation. In another preferred embodiment, the liquid radiation-polymerized material is circulated or agitated to help maintain consistency, especially when solid additives or particles are present in the material. In another preferred embodiment, the liquid radiation-polymerizable material is monitored and controlled for chemical constituents' concentrations, solids content, viscosity, color or other physical properties. In other preferred embodiments, the liquid radiation-polymerized material and/or its container may be controlled for temperature, humidity and exposure to atmosphere or other gases.

Steps 320, 330 and 340 of FIG. 1A describe optional actions that may be used in the invention. These steps function as an auxiliary control point. These steps are identified by the inventors because they may be of practical use in further refining or optimizing control of the additive layer properties. These optional steps may be particularly preferred when a large number of liquid layers will be applied, or when a dip coating approach as described in FIG. 2 is employed.

At optional step 320, measurements are obtained to determine the position, thickness and/or slope of the liquid layer in relation to the lens surface. This can be helpful to determine whether the material for the additive layer design is being applied correctly, and whether the liquid layer is behaving as expected. For example, one may expect the liquid to create a slight meniscus on the lens substrate. These optional measurements can check whether the meniscus is occurring as expected, or if the liquid's interactions with the surface are creating a different profile.

Several different techniques can be used to obtain this information. Preferably, non-contact analysis techniques are used in order to preserve the quality of any previous additive layer(s), the substrate and of the liquid layer and its radiation-polymerizable material that has not yet been polymerized. Preferably, the measurements comprise non-contact optical analysis, since these techniques often yield results that can be directly correlated to the optical properties expected for the final eyewear lens.

Among the various measurement techniques, the preferred techniques include reflected or transmitted light deflectometry, Moiré pattern comparison and triangulation.

The preferred non-contact measurement techniques can supply information or direct data about one or more of the following layer parameters: position of the layer on the substrate, local slope, and local height (thickness) of the layer. These values can be compared with the additive layer design of step 200, or can be used as inputs to calculate the optical power or other optical change (e.g., transmittance, polarization) achieved with the additive layer(s) applied previously or expected given the applied liquid layer. In addition, some techniques can provide direct data about the optical power achieved by the layer or the optical power achieved by the combination of the layer with the lens substrate (and one or more previous additive layers, as applicable). Preferably, measurements are conducted at several discrete points. Alternatively, data can be obtained along a line or multiple lines measured across the layer.

Reflected light deflectometry is particularly suitable for specular surfaces. In many instances, both the lens substrate and the liquid layer will present suitably specular surfaces. For this technique, controlled light, and more preferably, a collimated light beam or laser beam, is directed at the surface and the reflected beam analysed for position and distortion for detection of errors in the surface. Another possible technique is scanning beam deflectometry, which scans or steps a controlled beam of light across a surface area for analysis at more positions. Shack-Hartmann wavefront sensor techniques can also be used, which measure spot displacement in the sensor plane of an array of images. Localized slope can be calculated from the displacement and used to derive information about the layer and its expected optical power. Another form of deflectometry that can be useful for these measurements is reflected image-screen tests, in which reflected images of discrete points are analysed for distortion indicative of position and slope errors. The image screen may be generated by active means (e.g., LEDs) or passive light screens such as a retro-illuminated screen. Extended structure deflectometry is another exemplary measurement technique, using active means (e.g., a computer screen image) or passive means (e.g. a projected light/dark pattern) to create an image for reflection and analysis of errors.

If diffuse surfaces will be measured, triangulation is one example of a measurement technique that can be used in step 320. For a diffuse surface, a structured pattern is projected onto the liquid layer and/or the adjacent lens substrate surface, and displaced detectors are used to triangulate the position and height (thickness) of the layer. One or more cameras positioned in close proximity or in known offset from each other can be used as the detectors for triangulation.

For transparent substrates, one can measure with reflected or transmitted light measurement techniques. In addition to the reflected light techniques described previously, transmitted light deflectometry can also be used for optical through-power measurements. In this manner, one can analyse how the additive layer in combination with the lens substrate or any previous layers has changed the optical power of the lens substrate. An extended, structured source is directed through the liquid layer and the lens substrate, and the through-image distortion is measured and related to position, thickness and slope errors. Moiré pattern comparison techniques can also be used, in which a controlled grid pattern is imaged onto a reconstruction grid after passing through the lens, and the error pattern observed. Another exemplary Moiré technique images one grid onto another grid using the transmitted beam through the lens, wherein distortions correlate to errors in the lens.

Another exemplary transmitted light measurement technique is light-path triangulation. In one exemplary configuration of this method, a structured light source is directed through the liquid layer and the lens substrate and differences from the expected behavior of the bundle of transmitted light rays are noted. In another exemplary configuration, a calibrated camera is used to measure light reflected or transmitted through the lens. With such light-path triangulation techniques, measurements of reflected and/or transmitted light are used to calculate sets of surfaces and materials consistent with the observed input and output light ray bundles and the best fit is determined.

The measured results for light paths and patterns are compared with the calculated results that would be expected for the design defined in step 200 of FIG. 1A and the particular layer being applied. Care must be taken to account for difference in the properties of the liquid layer versus a polymerized additive layer; these may have different indices, thicknesses and slopes, for example. Corrections or accommodations can be included in the calculations for the differences expected between the liquid layer and a polymerized layer. Nonetheless, these techniques, particularly triangulation and deflectometry, may be helpful in determining at minimum whether the liquid layer is applied at the expected position on the lens substrate's surface (and/or on previous additive layers) and at a sufficient thickness.

Step 330 describes a decision point at which the error (if any) measured at step 320 is compared to error limits established by the user of this invention. If the measurements are within the error range, one continues with step 400. If the error is greater than the acceptable values, then one proceeds to step 340.

If this optional sequence of steps is used and errors greater than expected are measured, step 340 provides for calculation and application of corrective measures. Such corrective measures can include modifications to the additive layer design or to its application methods. This can involve, for example, re-application or removal of the liquid layer over some or all of the previously applied area on the lens substrate's surface. Alternatively, if changes to the liquid layer would be less desirable, too problematic, or introduce impurities or other new errors, other ways to correct for the errors can be employed. For example, calculations can be made to adjust the irradiation conditions that will be subsequently applied to the liquid radiation-polymerizable material. For example, if the liquid layer as measured was thicker than expected, more energy or more exposure time may be required to polymerize the full thickness of material. In another embodiment, position, height and/or slope conditions for one or more subsequent applied layer(s) may be recalculated and adjusted at step 340 and stored as a revision to the additive layer design, to correct for the errors measured at step 320.

At step 400, the liquid layer is irradiated to polymerize the material onto the lens substrate's surface. An important consideration for any additive layer material is that it must adhere well to the lens substrate and to other layers (if they are used), and not degrade the optical performance of the lens. This is important to maintain the usefulness of the eyewear lens and not shorten its lifetime. Delamination, peeling and cracking of coatings or layers in ophthalmic lenses have often been historical problems, especially when new technologies are introduced. The stresses and widely varying thermal, physical and chemical exposures to which eyewear lenses are subjected (during initial component processing, eyewear assembly and in use by the wearer) can place unexpected and severe demands on adhesion and integrity of a layered lens structure. Therefore, the polymerized layer must be integrally bonded to the lens surface (and/or previously applied additive layers). Integrally bonded means that the polymerized layer is chemically bonded or strongly physically bonded to the previous surface and/or previous additive layers such that the combined structure remains intact and without damage discernible to the unaided eye both during normal lens processing and in its normal use as an eyewear lens. The irradiation conditions are selected and administered to ensure that the inventive process will achieve such integral bonding.

The irradiation conditions at step 400 are selected with specific reference to the particular radiation-polymerizable material used in the liquid layer, and with respect to the position, slope and thickness of the liquid layer to be polymerized. For example, the radiation wavelength or wavelength range, radiation energy density, and spatial distribution of the energy beam may all be controlled or selected to suit the physical and chemical properties of the particular radiation-polymerizable material, and the liquid layer applied. A different energy density or spatial distribution of the energy beam may be used if the liquid layer is applied to both surfaces of the lens substrate rather than only one, and the irradiation at step 400 is expected to selectively polymerize material on both surfaces simultaneously. In another example, less energy or different irradiation conditions may be specifically chosen to selectively polymerize material on only one surface of the lens substrate. The irradiation conditions may also be tailored to take into account absorption or reflection by the lens substrate; these substrate properties could either be used advantageously to enhance the selective polymerization of an applied liquid layer, or require further adjustment of the irradiation conditions to correct for losses to (or through) the substrate.

In addition, how the liquid layer is subjected to the irradiation will be selectively controlled for the layer. This may include the length of time of exposure and whether single or multiple periods of irradiation are employed.

Importantly for the invention, irradiation conditions will be controlled to irradiate selected areas of the liquid layer. While this may encompass all areas of the liquid layer, the invention specifically envisions only discrete areas of the liquid layer being irradiated and selectively polymerized by that irradiation. Thus, as an example, a uniform liquid layer could be applied by curtain coating to the entire lens substrate surface, but the irradiation with a wavelength range and energy density sufficient to form the polymerized additive layer may only be applied to a selected area that comprises 2 mm dots at a spacing of 5 mm across the lens, to form a dotted alignment pattern. As another non-limiting example, the uniform liquid layer described above could be irradiated by light with a wavelength range and energy density sufficient to form the polymerized additive layer, but only in a selected area to create an oblong section 10 mm wide and 20 mm long on the lower half of the lens substrate surface, for use as a reading zone on the customized eyewear lens. The inventors intend that the radiation source is directed at the liquid layer with sufficient control of position and irradiation conditions that the polymerization process is limited to the selected areas directly irradiated. This is in contrast to previous methods that result in general polymerization of either the entire liquid layer, or the mass of radiation-polymerizable material by energy transfer outside the irradiated area. This is what is meant by irradiating selectively to produce a selectively formed polymerized additive layer.

The irradiating energy may be concentrated into a narrow beam, collimated, or more diffusely presented. Depending on the source selected and the polymerization requirements, different types of radiation sources may be selected, including monochromatic sources, lasers, actively or passively wavelength-filtered sources, LEDs, blackbody sources, atomic emission lamps, fluorescent lamps and other sources known in the art. The frequency of the irradiating energy may be in the UV, visible or infrared range, or in other energy ranges including microwave, radio-frequency, gamma, and X-ray radiation. Thermal energy can even be used if properly controlled for selective irradiation.

In a preferred embodiment, the radiation used to irradiate the liquid layer is chosen from microwave, radio-frequency, ultraviolet, or visible energy. In another preferred embodiment, a more limited wavelength range within the UV or visible energy spectrum is used to irradiate the liquid layer. In one preferred embodiment, energy in the blue wavelength range of the visible spectrum is used for irradiation. In another preferred embodiment, UV energy in the range of 350-380 nm is used to irradiate the liquid layer.

In another preferred embodiment, irradiation comprises using the blue channel (B) energy of an (R, G, B) (Red-Green-Blue) projector as the controlled radiation to form the polymerized layer.

Other light projectors may also be used. These may include projectors with both UV and visible light, or a projector using several visible wavelength ranges or different color channels. The projectors' light sources may include laser diodes, discrete multiple sources at different wavelength ranges, filter wheels on single sources and other techniques known in the art. Typically, three or more wavelength ranges are available in most projectors and one or more of these wavelength ranges may be used in the present invention.

In another preferred embodiment, a digital light processing (DLP) projector that uses a UV light source may be used for irradiation of a suitable liquid radiation-polymerizable material. In another preferred embodiment, the UV DLP projector could be replaced by a scanning laser beam, using a UV laser source and a mirror oriented using piezoelectric actuators.

In a preferred embodiment of the invention, the irradiating source and/or the lens substrate may move relative to each other. In addition, the irradiation source may be directed onto the same area of irradiation one or more times during the irradiation step 400. As one example, a selected area of the liquid layer may be irradiated to form the polymerized additive layer in that area. Then the edges of that area may be irradiated again in combination with some surrounding area of the liquid layer, to smooth or decrease a step feature at the edge of the polymerized layer. As another example, multiple exposures could be used to allow time for the radiation-polymerized reaction to proceed, to ensure that sufficient energy is absorbed to complete the reaction, or to strengthen the integral bond of the polymerized additive layer to the lens substrate and/or to previously applied additive layers.

The rotational/translational movements of the lens substrate proposed by the inventors and discussed previously may be used during irradiation as well as during the application of liquid layers. Such controlled movement of the lens substrate during irradiation can be used to smooth defects or edges of the layer being applied and irradiated, or to ensure that the irradiation occurs in those areas selected for the additive layer.

The liquid layer may be directly irradiated by the source in a continuous manner, or the energy may be filtered, pulsed, chopped, time sequenced, or reflected or transmitted through other controlling optics before reaching the layer.

In addition to forming the additive layers for optical power modification according to the additive layer design, the selective irradiation of step 400 can provide or improve other lens properties for the customized eyewear lens. As non-limiting examples, the selective irradiation may decrease yellowness, enhance layer adhesion, improve layer durability by increased cross-linking or densification, or remove material from specific locations by evaporation or ablation. In addition, the selective irradiation may be used to imprint visible or semi-visible marks on the customized eyewear lens.

At optional step 500, one may remove the unreacted liquid radiation-polymerizable material from the polymerized layer and/or lens substrate. One of ordinary skill in the art will recognize that this optional step can be included if it is helpful for production operations, inspection of the polymerized layer, conservation of the liquid radiation-polymerizable material, and other engineering considerations. The unreacted material can be removed by moving the lens substrate out of contact with the liquid, or moving the liquid material away from the lens substrate. For example, in FIG. 2, the liquid radiation-polymerizable material 21 is shown below the level of the lens substrate 11. In another exemplary embodiment of this optional step, the unreacted material may be removed from the surface by chemical methods, such as solvent rinse, solution soaking, vapor cleaning, plasma treatment, or other techniques known in the art. In another exemplary embodiment of this optional step, the unreacted material may be removed by physical methods, such as etching, washing, mild abrasive, doctor blade contact, wicking, or other techniques known in the art.

Step 600 identifies the possible location for a control point as identified for the design generated at step 200. At least one control point will be included in every embodiment of the inventive method. Control points may be placed after each layer to confirm the polymerized additive layer's properties and the performance of the design as deposited to that point. Alternatively, control points may be placed less frequently than after each layer, and could occur, for example, after a critical layer is applied, or after a determined combined thickness of multiple polymerized additive layers. If a design control point has been placed at this point (after the layer is applied in step 300 and irradiated at step 400), then the process continues with step 700. If the design does not contain a control point after the irradiation at step 400, then the process continues with step 900.

When step 600 identifies a control point, one continues with step 700, 800 and 820 (if needed). At step 700, the polymerized additive layer (or a combination of additive layers) may be measured to determine the layer(s)' localized position, thickness (height), slope and/or optical power in relation to the surface of the lens substrate. As another preferred embodiment, optical through-power or other transmitted light properties (e.g., light transmittance, polarization, photochromicity, UV absorbance, etc.) may be measured at step 700 to determine how the combination of the lens substrate plus the polymerized additive layer(s) at a given measurement location has changed the lens substrate's optical properties. In one preferred embodiment, measurement(s) of the lens substrate surface(s) are used in combination with measurements on additive layers for reference and localized comparisons.

As outlined previously for liquid layer measurement, several different techniques can be used to obtain this type of information or data. The techniques described at step 320 are exemplary of some of the techniques that are preferred and could be selected for use at step 700, too. The same measurement technique may be used for both the liquid layer and the polymerized additive layer(s), or different measurement techniques may be selected for each step. In another preferred embodiment, multiple techniques may be used for measurement of the polymerized additive layers. The same or different sets of measurement techniques may be used for different additive layers, or different combinations of additive layer(s) and the lens substrate. As one non-limiting example, surface reflectance techniques may be used to measure and calculate error for the first few layers, but transmittance measurement techniques may be used as one nears critical design steps or completion of the additive layer design to check the optical through-power of the lens (that is, the combined optical power change resulting when light is directed through the lens substrate and one or more of the additive layers applied to the lens substrate). The same or different measurement techniques may be used at different control points. In addition, the same or different measurement techniques may be used at one or more measurement locations for a given control point.

Non-contact measurement techniques are preferred to avoid damage to the polymerized additive layer. In one preferred embodiment, reflected light deflectometry is used for measurement. In another preferred embodiment, transmitted light deflectometry is employed. In another preferred embodiment, triangulation is used either in reflected or transmitted modes. The measurements for the control point may be made at one or more positions on the most recently deposited additive layer, and may also be made at one or more positions on previous layers or on the lens substrate for comparative calculations.

With reflected light measurements, information is gained primarily about the polymerized additive layer. This information is combined with data about the lens substrate (and any previous additive layers) to determine how the actual results compare with the expected results. With transmitted light measurements, information may be obtained directly or by calculation on how the additive layer has combined with the lens substrate (and any previous additive layers) to alter the lens substrate's properties.

In one preferred embodiment, a camera is mounted at a different, known position from the irradiation light source and used for measurement at step 700. An example of this is illustrated in FIG. 2 for an irradiation beam 31 and a camera 41. In another preferred embodiment, an (R, G, B) projector is used, in which the blue light of the projector operates as the irradiation source and the radiation-polymerizable material is not affected by the red or green light of the projector. Instead, the camera uses the red and green channels of the projector as its light sources to measure the optical properties of the applied layer and the layer's three-dimensional shape relative to the lens surface or previous layers.

In one preferred embodiment, the lens substrate and its polymerized additive layer or layers are not moved to a new position for these control point measurements. Measuring in situ can be desirable to avoid repositioning errors. In such measuring systems, the non-polymerized liquid may be drained away, spun off or otherwise removed from the polymerized layer and lens substrate surfaces before measurement at step 700, if desired. In another embodiment, the non-polymerized material is not removed during measurement at a control point. Instead, the measurement technique is designed to discriminate between liquid layers and the additive layer(s). For example, the measurement technique may detect when all the liquid material being probed has been converted to polymerized material; this could be possible, for example, when the liquid material has different refractive index, reflectivity or transmittivity properties than the polymerized material.

In another embodiment of the invention, the lens substrate with its polymerized layer will be moved to a different, preferably fixed, position for the measurements of step 700. This may be preferred for accommodation of some types of measurement devices, particularly with optical through-power measurements that may not be adaptable or convenient to position around the liquid application equipment.

It will be important for accuracy and reproducibility that any measurement system used accurately and repeatably identifies the positions of the layers and of the substrate. This is important to determine if the additive layers are being applied and polymerized in the correct areas according to the additive layer design, and to the designed parameters. If there is too much inaccuracy in the positioning of the sample for a control point measurement, one cannot determine if an error is caused by mis-positioning of the additive layer or simply that one is measuring in the wrong area on the customized eyewear lens.

These measurements will be used to compare the actual change caused by the polymerized layer with the additive layer design and the expected results for the polymerized additive layer applied. Calculations of the error or difference between the actual results and the design are then performed.

An advantage of this invention's method of applying additive layers is that one is not as dependent upon the overall dimensional accuracy of each applied layer as in the localized slope and thickness of the layer. A slight irregularity in a small spot on an additive layer may be smoothed over during subsequent liquid layer applications, or corrected (if necessary) via the control point measurements and review. This is a distinct difference from previous thin-film additive processing used for spectral filtering, which requires and expects uniform changes over an entire surface, rather than localized, positional control for specific optical power changes in a given area. Particularly when several additive layers will be used to create the customized lens, the invention will allow wider tolerances in the manufacturing process; the measurements and recalculations at the control point(s) are used to adjust subsequent additive layers for any previous, unacceptable errors. Advantageously, these control points and recalculations allow one using the inventive method to compensate for errors in individual layers, and prevent accumulation of errors as the customized eyewear lens is built.

At step 800 of FIG. 1B, errors (if any) measured at step 700 are compared to error limits established by the user of this invention. These error limits may be included for reference and for use in optimization within the additive layer design calculation at step 200, in the calculations of step 700, or may be compared manually with expected results from a separate measurement. If the measurements are within the accepted error range, one continues with step 900. If the error is greater than the acceptable values, then one proceed to step 820.

At step 820, if it is needed, corrective measures are determined for the additive layer design. This may involve another iteration of optimization calculations based on the actual properties of the polymerized layer or layers and may yield a revised additive layer design. The values for $z_{L-1}(x,y)$ to be used in the computation of a revised $t_L(x,y)$ for a revised additive layer design can be derived or obtained from direct measurement of the actual lens substrate surface and/or one or more previous additive layers at the control point measurement location(s). In addition, the calculation may use estimates based on the number of layers already added according to the additive layer design, or the number of layers added since a previous control point.

Corrective measures for the additive layer design are then planned and selected for implementation in a revised additive layer design. For example, if the error showed that polymerized material was deposited in too thick a layer, another layer may be applied thinner to accommodate for the previous error. In another example, if polymerized material is present on an area of the lens substrate that was not originally intended for that additive layer (for example, if a few droplets splashed onto another area), it may be possible to correct by applying a subsequent layer with a different refractive index or with ameliorative optical properties to hide this error. Other corrections encompassed by the invention would be recognized from these examples by those of ordinary skill in the art. The calculation methods used for the revision plan and optimization may be selected from those mentioned earlier, such as ray tracing, wavefront propagation analysis, curvature calculation, and Zernike multi-dimensional polynomial fitting, or other methods known in the art may be employed.

At step 820, adjustments are determined for the next polymerized layer or layers to be applied. In one preferred embodiment, these adjustments may be embodied in changes to one or more additional additive layers of the design. This may be desired if a large change is needed, or is more easily accommodate by multiple radiation-polymerizable materials or multiple additive layer applications.

The adjustments at step 820 can include changes to the position, thickness, and/or slope of the next additive layer or layers. In another embodiment, the total number of additive layers may be adjusted. In another preferred embodiment, the adjustments may comprise changes to the radiation-polymerizable material and/or its components for one or more subsequent additive layers. In another preferred embodiment, the selective irradiation for the next or subsequent additive layers may be modified to effect revisions at step 820; changes in irradiation can be employed either alone or in combination with applied layer changes.

Once the adjustments desired for the next additive layer or layers have been determined at step 820, one proceeds to step 1000 of FIG. 1B.

As described above, the route of step 820 is followed if too large an error was measured and calculated at step 800. An alternative route is followed to step 900 if the error (if any) measured for the deposited polymerized additive layer at step 800 was within acceptable limits, or if there was no control point after the irradiation of the applied layer (step 600). In these instances, one proceeds to the decision point at step 900 for additional applied liquid layers. One layer may be sufficient to create the new properties desired for the customized eyewear lens. Nonetheless, the inventors choose to measure the result (step 700) even with a one-layer design and confirm that the actual performance of the customized lens is in line with the expected results from the design. Therefore, for a one-layer design according to the invention, the steps of 500, 600, 700, and 800 will be followed, and if necessary, an adjustment via steps 820 and 1000 will be performed if required. On the other hand, the additive layer design of step 200 may require one or more additional additive layers to achieve the customized eyewear lens. Step 900 describes this query of the design to check which series of next steps to follow.

If no additional polymerized layers are required by the additive layer design to yield the desired properties of the customized lens, one proceeds toward the end of the process. Optional step 920 recognizes that other coatings may be added to the customized lens after the additive layer design is complete. Examples of some other coatings include: hard coat or abrasion-resistant coatings, smoothing coatings, photochromics, coatings to improve cleanability, polarized coatings, and conductive coatings or active coatings for display applications. These may be applied by various known techniques, including liquid or gas phase deposition. Exemplary additional coatings that are particularly suited for gas phase deposition techniques (such as vapor, atmospheric, corona, plasma and physical or chemical vacuum deposition) include anti-reflective coatings, filter coatings and conductive coatings. These and other coatings may be applied alone or in combination to provide optional additional lens features.

In addition, the optional coatings at step 920 may include other features added to the lens in, with, on or into the coatings. Examples of some of these features include decorative imprints; decals; jewelry; embedded chips, displays or sensors; micro-optics; and semi-visible marks for lens identification.

Optional step 940 can be used if desired to post-cure the lens. Post-curing may be used to anneal, stabilize, relieve material stress, densify or enhance the final properties of the applied additive layers and the customized lens. In a preferred embodiment, a post-cure exposure to heat and light can reduce yellowness of some polymerized materials. In another preferred embodiment, a post-cure can strengthen the integral bonding of the additive layer(s) to the lens substrate and/or to each other. A post-cure step may involve general exposure of the lens to broad spectrum thermal, infrared or other forms of energy, or controlled exposure to a specific wavelength or energy range. This is sometimes used as a finishing step in eyewear lens production.

At this point, when the last additive layer has been applied and irradiated according to the additive layer design (either the original design, or as revised based on the control point measurement), and any optional steps have been performed, the customized lens production according to the invention is complete.

In another embodiment of the invention, if additional polymerized layers are part of the additive layer design (as queried at step 900), one proceeds with step 1000. The radiation-polymerizable material applied at step 1000 may be the same as that applied at step 300. Alternatively, in another preferred embodiment, the radiation-polymerizable material applied at step 1000 may comprise a different radiation-polymerizable material than that applied at step 300. In another preferred embodiment, the radiation-polymerizable material of the additional layer or layers comprises different components than the first applied layer. In another preferred embodiment, the radiation-polymerizable material of additional layer(s) has measurably different optical or physical properties from the first radiation-polymerizable material. Subsequent layers may each comprise different radiation-polymerizable materials and/or components than previous layers, or may be the same as one or more previous layers. Such variations are within the scope of the invention, and understood by those of skill in the art.

Additional layers of liquid radiation-polymerizable materials may be applied to previous radiation-polymerized additive layers, to portions of the original lens substrate's surface where additive layers were not previously applied, or to surfaces of the original substrate where layers were not previously applied. In another preferred embodiment, the layer applied at step 1000 may bridge across a combination of both the original lens substrate and one or more previously applied additive layer(s). For easier reference, these options and other variations to describe how additional liquid layers are present on the lens substrate and/or on portions of any or all previous additive layers are referred to as application zones. An application zone identifies where an additional liquid layer is applied or has spread prior to its selective irradiation. For example, after a first liquid layer has been applied and irradiated to form a first additive layer, a second liquid layer may be applied to an application zone that comprises at least a portion of the first lens substrate surface, at least a portion of the second lens substrate surface, at least a portion of the first additive layer, or a combination of at least a portion of one of the lens substrate's surfaces and a portion of the first additive layer. In a similar manner, additional liquid layers may be applied, for example, in application zones that comprise portions of one or more of the lens substrate's surfaces, portions of one or more previously applied additive layers, combinations of both a portion of a lens substrate surface and a portion of a previously applied additive layer, or combinations of portions of two or more previously applied additive layers and a portion of a lens substrate surface. The same application zone may be used for multiple subsequent liquid layers, or different application zones may be employed.

The final area of the additive layer produced from the liquid layer will in most cases occupy an equal or smaller area than the application zone. The final area of an additive layer will depend on both the application zone and the selective irradiation of an additive layer's precursor liquid layer; the additional additive layer of the invention is formed selectively and only in its selected area of the controlled irradiation. In addition, the controlled irradiation of the liquid layer will integrally bond the resultant additive layer in the selected area of controlled irradiation to the previous layer(s) and/or lens substrate surfaces that constitute the application zone in that area.

Some examples of various positioning of the additive layers that result from application zones of multiple liquid layers are illustrated in FIG. 2. Additive layer 51 is shown in its integrally bonded position on a portion of the surface of the lens substrate 11. Exemplary additive layer 52 has been polymerized (as indicated by the horizontal hatch marks) onto a portion of additive layer 51 and a portion of the surface of the lens substrate 11. This is an example of a layer bridging across previous structures. Exemplary layer 53 is shown as it is being processed according to one embodiment of the invention, including areas 53*a*, 53*b* and 53*c*. In this example, the lens substrate is being moved during irradiation in at least a positive y-axis direction (moving to the right in the drawing); it may also be subjected to movement in the z direction and rotational or translational movement in the x-direction. The portion of layer 53 to the left of the irradiation beam (53*a*) is still a liquid layer, as indicated by the dashed line markings like those of the liquid radiation-polymerizable material shown below the lens substrate at 21. The area of layer 53 directly under irradiation beam 31 (area 53*b*, shown in cross-hatch) is being polymerized by the selective radiation. The area 53*c* to the right in FIG. 2, where layer 53 is shown with horizontal hatch marks, indicates the area of the applied liquid layer that has been converted already to a polymerized additive layer by exposure to the irradiation beam 31. Layer 53 in this example has been applied onto a portion of previous additive layer 52, which may comprise the same or different radiation-polymerized materials (or components) than either layer 51 or 53.

The additional layers of radiation-polymerizable material, applied according to the additive layer design, can serve multiple purposes. For instance, an additive layer may be positioned and designed to smooth over edge effects on previous additive layers as well as contribute to the optical power of the customized eyewear lens. In this embodiment of the invention, the additive layer that also functions as a smoothing layer may, for example, be thinner, or have a lower viscosity or lower surface tension than previous layers, such that it spread out over the edge of the previous additive layer or layers and smoothes the layered contours. This may also be accomplished by applying the smoothing additive layer in a slightly different location on the lens from the previous layers. In one preferred embodiment, the refractive index of the smoothing additive layer(s) is matched to the previous additive layer or layers, to reduce optical interference effects. It may also be helpful to create the additive layer design as a combination of thinner layers interspersed with thicker layers, to reduce step heights at the edges of additive layers.

The additional additive layers may also be designed to provide new areas on the customized lens surface with different properties than those supplied by the substrate or by previous additive layers. One example of this would be when the first applied additive layer has one refractive index and creates one optical power by its addition to the lens substrate, while the layer applied at step 1000 comprises radiation-polymerizable material and/or components that will create a different refractive index and a different optical power in the regions where it has been applied.

After applying the next liquid layer at step 1000 of FIG. 1B, one proceeds with either the optional measurements and subsequent optional actions outlined at steps 320, 330 and 340, or proceeds to step 400. If the optional steps 320, 330 and 340 are followed, the measurements may assess the properties and position of the liquid layer applied at step 1000 with respect to the lens substrate and/or with respect to previously applied additive layer(s).

At step 400, the radiation may be the same or a different frequency than that used for the first layer, and may be controlled for the same or different values of wavelength range, energy and spatial distribution to form the additional polymerized additive layer(s). These controlled parameters will be determined by the radiation-polymerizable materials being used for the layers, as well as the individual layer's position, thickness and/or slope. For example, a different energy of the radiation may be necessary if the layer applied at step 1000 is applied over a previous additive layer that is reflective instead of a material that is transparent to that wavelength range; the reflective layer may effectively allow a double exposure of the liquid layer in the area of irradiation, and therefore less energy may be required in such areas. In addition, the irradiation will be controlled to form the additive layer from the liquid layer only in the selected area, to form the additive layer according to the additive layer design, and to integrally bond the additive layer to its application zone. The selected area of any given liquid layer that is irradiated will be specific to that layer, but may form the additive layer from its precursor liquid layer in either the same or a different location than previous additive layers, depending on the requirements of the additive layer design.

As indicated, the sequence of steps may be continued for more than two liquid layers and will depend on the design generated in step 200, with any revisions that have occurred, for example, at steps 340 or 820. The sequence is repeated until no further layers are indicated at step 900, at which point one proceeds through the optional steps of 920 and 940 to completion of the process of the invention.

In another preferred embodiment, a layer comprising a photo-initiator is applied either immediately before or after step 300, or immediately before or after step 1000. (This action is not included in the flowchart of FIG. 1A and FIG. 1B.) The layer comprising photo-initiator may comprise material compatible with the radiation-polymerizable material(s) to be used in the process, and capable of integral bonding to them. In one embodiment, the layer comprising photo-initiator may be very thin, such that it does not affect the overall optical power of the additive layer design. These optional layers of photo-initiator are one preferred addition by the inventors to control and enhance the depth and extent of cure of the adjacent radiation-polymerizable layers.

In another embodiment of the invention, a primer layer may be applied before one or more of the liquid radiation-polymerizable liquid layers that will form the additive layers are applied. Such primer layers may enhance adhesion, or ameliorate stress or thermal expansion mismatch, between the lens substrate and subsequent additive layers, or between stacked additive layers.

When the customized eyewear lens is completed, it may be placed in the individually chosen eyewear frame. It may be necessary to edge the customized eyewear lens to its final size to accomplish this step. Alternatively, in one preferred embodiment of the invention, the lens substrate is edged to fit the frame prior to performing the additive layer process; this simplifies assembly of the final eyewear. In another preferred embodiment, the lens substrate and the eyewear frame are fitted together prior to the inventive process, and the entire set of eyewear proceeds through the additive layer applications. In this embodiment, if desired, additive layers can be applied to the eyewear frame as well as the lens substrate for new or enhanced features. In another preferred embodiment, the additive layer process can create the eyewear frame to be used with the customized lens.

In another embodiment of the invention, if the additive layer design was generated to convert the lens substrate's optical power to a desired set of optical powers for the customized eyewear lens that comprise intermediate optical power values, it may be necessary to complete fine polishing or to smooth the customized eyewear lens prior to insertion in the eyeglass frame. This embodiment of the invention may be practical, for example, when the customized eyewear lens must be shipped to its final destination and could be scratched in transit; final finishing after producing the customized lens may be more efficient and less costly than complicated packaging and handling.

In another embodiment, the additive layer design may convert the lens substrate's optical power properties to a set of desired optical properties for the customized eyewear lens, and convert other properties of the lens substrate into additional intermediate properties for the customized lens. As an example, the additive layer design may comprise radiation-polymerizable material or components that add photochromic, polarized or scratch-resistant performance to the customized lens in addition to optical power changes. A customized eyewear lens such as this example may optionally be further coated at step 920 with smoothing layers, AR coatings, or other coatings to complete the functional or protective attributes of the customized eyewear lens.

These variations and configurations are not comprehensive of all possible embodiments, but provide examples that one skilled in the art would recognize are within the scope of the invention.

The invention will now be described in more specific detail with reference to the following non-limiting examples.

Example 1

A plus powered finished lens substrate is held in a fixed mount such that the concave surface is exposed. (The concave surface of the lens substrate is the surface that will be nearest the eye when the customized lens is worn.) In this Example, an additive layer design is generated with successive additive layers of approximately 10 micrometers thickness each, comprised of one radiation-polymerizable material to be deposited on the concave surface of the lens substrate using a spray coating mechanism. The purpose of the additive layer design in this Example is to form a +2.00 Diopter added optical power region located on a portion of what will be the lower half of the customized eyewear lens when it is mounted in its frame. In this Example, if a lens substrate with refractive index of n=1.5 is used, and the additive layers comprise radiation-polymerized material that has a refractive index of 1.5, then 200 additive layers of approximately 10 micrometers thickness each will need to be applied to create a region with +2.00 Diopter optical power. In this Example, the liquid layer applied by spray coating will need to be slightly thicker than 10 micrometers, to allow for evaporation and densification upon irradiation to form the polymerized, integrally bonded material of the additive layer.

Each liquid layer is irradiated with a projected pattern, made using a UV laser light source and a digital light processing projector, to create the radiation-polymerized additive layer of material. The radiation-polymerizable material is selected such that it forms an integral bond with the lens substrate, and with successive polymerized additive layers. A Shack-Hartmann sensor is used to measure the local curvatures on the deposited and polymerized layer, and compared to the expected results for each additive layer.

In this Example, the first layer is applied to approximately one-half of the area of the concave surface of the finished lens substrate. (This half of the lens substrate will correspond to the lower half of the resultant customized eyewear lens as mounted in the final eyewear frame.) The projected pattern of UV radiation creates a pattern of polymerized material integrally bonded onto the lens substrate. For this Example, the projected pattern is chosen as a irradiation beam that is circular in shape and is directed at the liquid layer in a selected area to create a circular area of radiation-polymerized material that is at least 8 mm in diameter and centered at least 8 mm below the center of the lens substrate on its concave surface. For this Example, the selected area irradiated (that creates the additive layer of polymerized material) is smaller than the total area to which the liquid layer is applied. Non-polymerized material is washed off the substrate.

At the control point for this Example, the concave surface with the additive layer is measured with a Shack-Hartmann type sensor to compute the curvatures of the current concave surface after applying the last additive layer, which is designated N−1. The measured result is compared with the calculated additive layer design at layer N−1, and the geometry of the following layers is compensated, such that the requested curvature of layer N (the next layer to be applied) is adjusted to be: (the designed curvature for layer N)−(the error curvature of layer N−1).

Using the error adjustment found by measurement, the next layer of radiation-polymerizable material is applied by spray coating onto the same area as the previous liquid layer. In this Example, the next liquid layer area will extend beyond the edges of the previously polymerized additive layer. This next liquid layer is irradiated with the same radiation pattern as the first layer to create another additive layer on top of the previous additive layer of radiation-polymerized material. Measurement using the Shack-Hartmann sensor is used to confirm results or generate adjustments for the next additive layer to be applied. This process is repeated for multiple layers until the desired +2.00 Diopter additional power in the area of the additive layers of this customized eyewear lens is achieved.

In the Example, every tenth layer is irradiated with another projected light pattern that extends beyond the area of the circular irradiation beam, to create a slightly larger additive layer for edge-smoothing purposes.

Example 2

A finished plano lens substrate with a finished and polished convex surface is attached to a support mechanism such that the concave surface is exposed for the additive layer process in a configuration such as that illustrated in FIG. 2. The volume of the layers to be built on top of the initial substrate is computed as a series of successive layers with different thicknesses, such that each individual layer is no thicker than 100 micrometers at any point.

The blue light from an (R, G, B) projector is used to irradiate and selectively polymerize the liquid radiation-polymerizable material for the additive layer design. The red and green channels are specifically chosen to have wavelength distributions outside of the range that can cause reaction or polymerization of the material.

Before being attached to the support mechanism, the convex surface of the lens is covered with a plastic film (not shown in FIG. 2) that is opaque to the blue light being used for polymerization. This protects the convex surface of the lens substrate from being altered during the additive layer process. The support mechanism is designed to allow movement of the lens substrate 11 in the Y and Z directions with a precision of 1 micrometers. The support mechanism can also rotate the lens substrate around the X-axis in an angle $\alpha$ having a precision of 1 mrad. The support mechanism will introduce the lens into a tank holding a liquid radiation-polymerizable material 21. The position of the lens substrate (Y, Z, $\alpha$) is known for any time t, and follows a trajectory that has been computed for each layer to be applied on the concave surface of the lens. The trajectory estimates the point of contact of the liquid surface with the lens concave surface for any instant t. The trajectory also estimates the angle of contact of the concave surface with the liquid.

The (R, G, B) projector is mounted in a vertical position (shown as beam 31 in FIG. 2) over the tank that holds the liquid radiation-polymerizable material 21.

A camera (41 in FIG. 2) is mounted at an oblique position over the tank that holds the liquid radiation-polymerizable material 21. The projector's red and green channels and the camera are used as a triangulation system using structured light patterns to measure either the three-dimensional shape of the liquid surface around the estimated zone of contact between the irradiation beam 31 and the liquid layer (53), or the three-dimensional shape of the additive layers in the region of intersection of beam 31 and the viewing zone of camera 41. The projector and camera system incorporate projecting and focusing optics, respectively, to ensure that the field of measurement is approximately 5 mm along the Y direction and 20 mm along the X direction. Measurement of (X, Y, Z) coordinates of the liquid layer (as in step 320 of FIG. 1A) or of the additive layer(s) (as in step 700 of FIG. 1B) can be achieved with a precision of $\frac{1}{1000}$ of the field of measurement.

The smoothness of each of the layers being built is achieved by constant motion of the lens during the irradiation process, and by the combination of different additive layers being built with different orientations (angle $\alpha$) due to different distributions of irradiation with respect to the applied liquid surface for each point (X, Y, Z). Smoothness can also be achieved by different positions of subsequent additive layers with respect to location on the lens substrate surface or previous additive layers.

In this arrangement, both the surface of the liquid layer (as in step 320 of FIG. 1A), and the surface of the polymerized additive layer(s) (as in step 700 of FIG. 1B) are measured without contact using the same projector-camera 3D registration mechanism. In the case of measurement of the polymerized additive layer, the liquid radiation-polymerizable material 21 can be lowered, as shown in FIG. 2, below the area of the polymerized additive layer.

The measurements are made after every layer, or after every N layers. The errors detected in the surface will be used to calculate adjustments of the next layers to be applied to build the total design desired.

Example 3

In another embodiment, the support mechanism and dipping method of EXAMPLE 2 is used with a different light source and measurement system. For EXAMPLE 3, an extended, structured light source like an LCD screen is used for irradiation. The camera and the extended light source measure the surface of the liquid close to the concave surface of the lens substrate by triangulation. In addition, the camera and extended light source is used to measure the shape of the polymerized additive layers for any errors, and the position, thickness or slope of the next layers of the additive layer design are adjusted based on the calculated errors.

Although the invention has been disclosed in detail with reference to preferred embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein. Accordingly, the invention is identified by the following claims.

What is claimed is:

1. A method of producing a customized eyewear lens comprising:
   a) obtaining a lens substrate comprising a first surface nearest the eye when worn and a second surface farthest from the eye when worn, wherein the lens substrate comprises optical power properties that are discernibly different to the unaided eye from the customized eyewear lens' optical power properties;
   b) calculating the total modification needed to convert the lens substrate's optical power properties to a desired set of optical power properties for the customized eyewear lens, generating an additive layer design comprising two or more additive layers to achieve the total calculated modification and identifying at least one control point with error limits for confirmation or revision of the additive layer design;
   c) applying a first liquid layer comprising a first radiation-polymerizable material to at least a portion of one of the surfaces of the lens substrate;
   d) irradiating a selected area of the first liquid layer with radiation that is controlled for wavelength range, energy and spatial distribution to form a first additive layer by polymerization only in the selected area irradiated, wherein the first liquid layer is irradiated according to the additive layer design, and wherein the first additive layer is integrally bonded to the lens substrate;
   e) applying a second liquid layer comprising a second radiation-polymerizable material to a first application zone selected from the group consisting of at least a portion of one of the surfaces of the lens substrate, at least a portion of the first additive layer, or a combination of both a portion of a lens substrate surface and a portion of the first additive layer;
   f) irradiating a selected area of the second liquid layer with radiation that is controlled for wavelength range, energy and spatial distribution to form a second additive layer by polymerization only in the selected area of the second liquid layer irradiated, wherein the second liquid layer is irradiated according to the additive layer design, and wherein the second additive layer is integrally bonded to the first application zone, and
   g) performing the following steps at the at least one control point,
      g1) measuring one or more localized properties comprising at least the localized slope of at least one of the layers selected from the first liquid layer, the first additive layer, the second liquid layer and the second additive layer, wherein the measurement of the localized slope is made at one or more measurement locations;
      g2) calculating an error between the measured localized properties and expected results for the additive layer design at each measurement location;
      g3) comparing the error with error limits of the at least one control point, and
      g4) revising the additive layer design if the error is greater than the error limits of the at least one control point,
   wherein the method of applying each of the first and second liquid layers is selected from the group consisting of spin, dip, spray, roller, blade and curtain coating.

2. The method of claim 1, further comprising:
   (h) applying one or more additional liquid layers comprising radiation-polymerizable material to an application zone selected from the group consisting of at least a portion of one of the surfaces of the lens substrate, at least a portion of the first additive layer, at least a portion of the second additive layer, a combination of both a portion of a lens substrate surface and a portion of the first additive layer, a combination of both a portion of a lens substrate surface and a portion of the second additive layer, a combination of both a portion of the first additive layer and a portion of the second additive layer, and a combination of a portion of a lens substrate surface, a portion of the first additive layer and a portion of the second additive layer, wherein the method of applying each of the one or more additional liquid layers is selected from the group consisting of spin, dip, spray, roller, blade and curtain coating; and
   (i) irradiating a selected area in each of the one or more additional liquid layers with radiation that is controlled for wavelength range, energy and spatial distribution to form one or more additional additive layers by selective polymerization of each additional liquid layer, wherein each additional additive layer is formed only in the selected area that each additional liquid layer is irradiated, wherein the one or more additional liquid layers are irradiated according to the additive layer design and each additional additive layer is integrally bonded to its application zone.

3. The method of claim 2, wherein irradiating a selected area of at least one of the additional liquid layers further comprises forming at least one additional additive layer such that it smoothes over features selected from at least one edge of the first additive layer, at least one edge of the second additive layer, at least one edge of one additional additive layer, discontinuities on a portion of at least one surface of the lens substrate, and irregularities on a portion of at least one surface of the lens substrate.

4. The method of claim 1, wherein the lens substrate is selected from finished lens blanks, semi-finished lens blanks, plano lens blanks, plano edged lenses and finished edged lenses.

5. The method of claim 1, wherein the one or more localized properties at each measurement location further comprise one or more additional localized properties selected from the group consisting of the height, optical power and position of the additive layers present at the measurement location, and the optical through-power of the combination of the lens substrate and the additive layers present at the measurement location.

6. The method of claim 1, wherein the first radiation-polymerizable material and the second radiation-polymerizable material are the same radiation-polymerizable material.

7. The method of claim 1, wherein the first radiation-polymerizable material comprises different components than the second radiation-polymerizable material.

8. The method of claim 1, wherein the first radiation-polymerizable material comprises components selected from the group consisting of photo-initiators, UV absorbers, infrared reflectors, visible tints, dyes, pigments, photochromic agents, thermochromic agents, electrochromic agents, polarizers, thermal stabilizers, electrically conductive materials, liquid crystal materials, light absorbing particles, light reflecting particles, sensors, transmitters, and displays.

9. The method of claim 1, wherein the first additive layer has properties measurably different from the lens substrate, and the measurably different properties are selected from the group consisting of refractive index, Abbe value, abrasion resistance, impact resistance, resistance to organic solvents, resistance to bases, Tg, visible transmittance, UV transmittance, polarization and photochromic properties.

10. The method of claim 1, wherein the first liquid layer is applied to the first surface of the lens substrate.

11. The method of claim 1, wherein the first liquid layer is applied to both the first and second surfaces of the lens substrate.

12. The method of claim 1, wherein the method of irradiating a selected area of the first liquid layer forms the first additive layer on only a portion of one of the surfaces of the lens substrate.

13. The method of claim 1, wherein the method of irradiating a selected area of the first or second liquid layer further comprises moving the lens substrate in at least one direction selected from Y-translation, Z-translation and rotation.

14. The method of claim 1, further comprising applying a layer comprising a photo-initiator.

15. The method of claim 1, wherein the wavelength range of the radiation used in steps d) and f) is selected from the group consisting of microwave, radio-frequency, ultraviolet, visible and infrared radiation.

16. The method of claim 1, wherein irradiating a selected area of the second liquid layer further comprises forming the second additive layer such that it smoothes over features selected from at least one edge of the first additive layer, discontinuities on a portion of at least one surface of the lens substrate, and irregularities on a portion of at least one surface of the lens substrate.

17. The method of claim 1, wherein the additive layer design further comprises modifying one or more properties for the customized lens selected from polarization, photochromicity, UV transmittance, visible transmittance, light reflectance, hydrophobicity, chemical resistance, abrasion resistance, impact resistance, and electrical conductivity.

18. The method of claim 17, wherein a number of additive layers in the additive layer design comprises at least 200 layers.

19. The method of claim 1, wherein a number of additive layers in the additive layer design comprises at least 50 layers.

* * * * *